Sept. 28, 1965 G. E. EDGINGTON ETAL 3,209,251
PERIOD-TO-RATE CONVERTER HAVING MEANS FOR
SUMMING CAPACITOR DISCHARGE CURVES
Filed Oct. 23, 1961

INVENTORS
GLENN E. EDGINGTON
CHARLES E. McCARTHY JR.
BY Donald F. Voss
ATTORNEY

United States Patent Office 3,209,251
Patented Sept. 28, 1965

3,209,251
PERIOD-TO-RATE CONVERTER HAVING MEANS FOR SUMMING CAPACITOR DISCHARGE CURVES
Glenn E. Edgington and Charles E. McCarthy, Jr., Rochester, Minn., assignors to International Business Machines Corporation, New York, N.Y., a corporation of New York
Filed Oct. 23, 1961, Ser. No. 146,871
3 Claims. (Cl. 324—78)

This invention relates to apparatus for measuring the frequency of a time-varying repetitive electrical signal and, more particularly, to apparatus for determining the repetition rate of a pulsating voltage.

The repetition rate is derived from the period or time interval between corresponding reference positions on the voltage waveform. The frequency or rate of the repetitive electrical signal is equal to 1/T, where T is the period of one cycle. If T is in seconds and the frequency is to be indicated in reptitions per minute, then $$f = \frac{60}{T}$$

applies.

Plotting rate versus time results in a hyperbolic curve and a series of exponential curves can be added to each other to approximate the hyperbolic curve just mentioned over a specified interval. Physically, an exponential decay results when a capacitor discharges through a resistor. Hence, a series of capacitor, resistor circuits discharge in a manner to approximate the hyperbolic curve; i.e., $$\sum_{i=1}^{n} V_i e^{-t/R_i C_i} \approx \frac{60}{t}, \text{ where } T_{\min} \leq t \leq T_{\max}.$$

The relative sizes or values of the resistors and capacitors determine the value of the exponent, and the voltage $V_1$ to which the capacitors are charged represent the coefficients. The number of terms $n$ varies according to the range of frequencies and the closeness of fit desired. The time T equals the period of one cycle.

According to the invention, a series of capacitors are normally connected to a resistance voltage divider network whereby the capacitors become fully charged. The voltage waveform, which is to be measured, is applied to a circuit, such as a slope and level detection circuit, which penetrates a sharp impulse when the voltage wavefrom reaches a predetermined value with a slope in a predetermined direction. By this arrangement, a first impulse is generated as the voltage waveform reaches the predetermined value when increasing in the predetermined direction. A second impulse is generated as the corresponding portion of the succeeding cycle of the waveform also reaches the predetermined value in the predetermined direction. The time between the first and second impulses is thus equal to the period of one cycle for the particular voltage waveform whose frequency is being measured.

The first impulse operates switching apparatus, such as a relay, which disconnects the capacitors from the charging network and connects them to a discharging circuit. The capacitors then discharge for the subsequent period of time until the second impulse occurs. The second impulse operates switching apparatus which disconnects the capacitors from the discharging circuit and connects the same to a voltmeter to effect a reading of the remaining voltage of the capacitors. This reading is then a direct indication of the frequency in the desired units. It should be noted that the capacitors remain disconnected from the charging voltage source as they are switched from the discharging circuit to the voltmeter.

In order to provide proper numerical values, a constant bias is provided to result in an infinitely long time constant. The switch time of the switching apparatus should be negligible relative to the period.

Therefore, a prime object of the invention is to provide an improved arrangement of apparatus for measuring the repetition rate of a pulsating votlage.

Another very important object of the invention is to provide apparatus for measuring the repetition rate of a pulsating voltage by determining the period of said pulsating voltage and converting the period to frequency.

Still another object of the invention is to provide apparatus for measuring the reptition rate of a pulsating voltage which is relatively inexpensive.

The foregoing and other objects, features and advantages of the invention will be apparent from the following more particular description of a preferred embodiment of the invention, as illustrated in the accompanying drawings.

Figure 3:
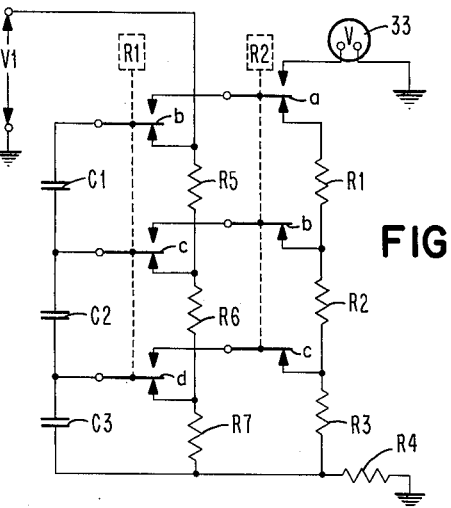
Figure 4:
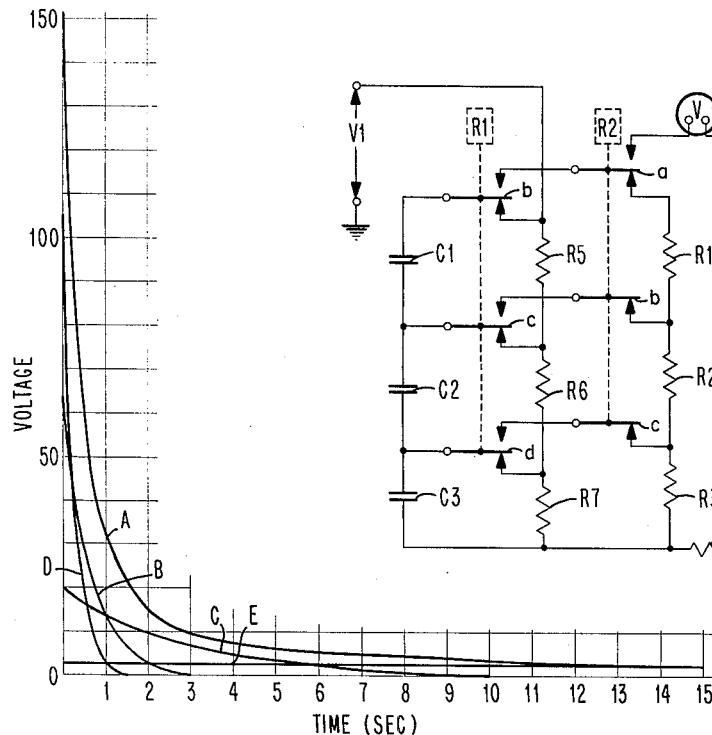

FIG. 3 is a schematic circuit diagram of the capacitors, the charging source, the bias means, the discharging circuit and the voltmeter with the connection therebetween; and FIG. 4 is a schematic diagram of a series of curves plotted on rectangular coordinates with time as the abscissa and voltage as the ordinate where curve A is the resultant hyperbolic curve approximation from combining curves B, C, D and E; curves B, C and D being exponential curves representing the discharge of the individual associated capacitors, and curve E representing the bias.

Figure 1:
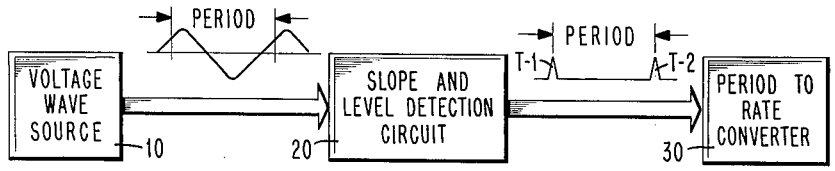
FIG. 1 is a schematic block diagram showing a pulsating voltage source, a slope and level detction circuit, a period-to-rate converter and the connections therebetween.

Referring to the drawings and particularly to FIG. 1, the invention is illustrated by way of example as a voltage wave source 10 being connected to the input of a slope and level detection circuit 20. The voltage wave source 10 can, for example, be a physiological monitor including transducers, not shown, for measuring the pulse rate or respiration rate of a human being. The pulse and respiration period generally varies in a range between .4 second and 12 seconds. Of course, it is understood that the invention is suitable to measure the frequency of pulsating voltages having a wide range in periods.

The slope and level detection circuit 20 is of the type well known in the art, and it functions to generate an electrical impulse every time the voltage wave of the voltage wave source 10 reaches a predetermined level at a predetermined slope. By this arrangement, the period of one cycle of the waveform may be determined. The period of one cycle would be the time between any two successive electrical impulses generated by the slope and level detection circuit because an electrical impulse will be generated only at corresponding successive points of the voltage waveform. The output of the slope and level detection circuit is shown as being connected to the input of a period-to-rate converter 30 which will be described shortly hereinafter.

Figure 2:
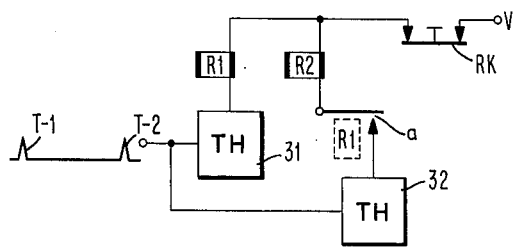
FIG. 2 is a schematic circuit diagram of the circuitry for energizing the relays which function as switching apparatus.

The first electrical impulse generated by the slope and level detection circuit 20 is identified as T–1, and it is applied to the control grids of thyratrons 31 and 32, FIG. 2. As it will be seen shortly, the thyratron 32 cannot be rendered conductive until after relay R1 is energized. Hence, while the electrical impulse T–1 is applied to the control grids of the thyratrons 31 and 32, only thyratron 31 will be responsive. Thyratron 31 has its plate connected to a voltage V through a relay R1 and a reset key RK. The thyratron 32 has its plate connected to the voltage V through a normally open contact R1a of relay R1, a relay R2 and the reset key RK. Hence, by this arrangement, the electrical impulse T-1 applied to the grids of thyratrons 31 and 32 will render thyratron 31 conductive, thereby causing relay R1 to become energized. By the time the relay R1 becomes energized, the electrical impulse T-1 will have disappeared. Therefore, the thyratron 32 will not be rendered conductive at this time but will be conditioned for becoming conductive upon another electrical impulse being applied to its control grid.

The relay R1 becomes energized as the pulse T-1 is applied to the grid of the thyratron 31 and remains energized until the reset key RK is operated to open the plate circuit, thereby extinguishing thyratron 31. The reset key RK is not operated until after the rate of the pulsating voltage has been measured. With relay R1 energized, the relay R2 becomes energized as the impulse T-2 is applied to the gride of thyratron 32, thereby rendering the same conductive. While the electrical impulse T-2 is also applied to the grid of thyratron 31, there is no effect because the thyratron 31 is already in the conductive state. Relay R2 also remains energized until the reset key RK is operated to open the plate circuit of the thyratron 32.

The relays R1 and R2 and the thyratrons 31 and 32, while shown separately in FIG. 2, are part of the period-to-rate converter 30 of FIGS. 1 and 3. In this example, there are three RC networks, FIG. 3, connected in series. Resistor R1 and capacitor C1 form one RC network, resistor R2 and capacitor C2 form a second RC network and resistor R3 and capacitor C3 form a third RC network. Resistor R4 functions as a bias resistor. The charging voltage source V1 is a very accurate voltage of a discrete amount. Capacitors C1, C2 and C3 are charged to selected voltages determined by resistor divider network R5, R6, R7 and R4. These voltages are applied to the three capacitors by means of connections through normally closed contacts R1b, R1c and R1d of the relay R1. The values of the voltage source V1 and the capacitors C1, C2 and C3 and the resistors R1, R2, R3, R4, R5, R6 and R7 for this particular example will be given.

Normally open contacts R1b, R1c and R1d of the relay R1 are connected to normally closed contacts R2a, R2b and R2c of relay R2, respectively. The normally closed contacts R2a, R2b and R2c of the relay R2 are also connected to resistors R1, R2 and R3, respectively. The resistors R1, R2, and R3 function as discharging resistors and are connected to ground via the bias resistor R4. A normally open relay contact R2a of the relay R2 is connected to one terminal of voltmeter 33 which has its other terminal connected to ground potential.

In this particular example, resistors R4, R6 and R7 have the values of 333K ohms, 102.25K ohms and 550K ohms, respectively. The bias resistor R4 has a value of 12.32K ohms. Capacitors C1, C2 and C3 have the values of 7.96 microfarads, 9.95 microfarads and 3.93 microfarads, respectively. The charging voltage V is approximately 3.807 volts. The resistors R1, R2 and R3 have the values of 78.620K ohms, 287.085K ohms and 60.583K ohms, respectively. These particular values have been determined empirically to yield a reading in hundredths of a volt which is numerically equal to the frequency in cycles per minute. However, it is possible to determine these values mathematically by the technique known as separation of exponentials.

The voltage source V1 charges capacitors C1, C2 and C3 through the resistor divider network R5, R6, R7 and R4 until they are fully charged. As the voltage wave from wave source 10 is applied to the slope and level detection circuit 20, the electrical impulse T-1 is generated upon the voltage wave reaching the predetermined value when rising in the predetermined direction. The electrical impulse T-1 causes thyratron 31 to conduct, whereby relay R1 becomes energized. Upon the energization of the relay R1, the contacts thereof are transferred and the normally open contacts R1a, R1b, R1c and R1d are then closed. Upon closing of the normally open contacts R1a, R1b, R1c and R1d, the thyratron 32 is conditioned for being rendered conductive and the capacitors C1, C2 and C3 start to discharge through the resistors R1, R2 and R3. While the capacitors C1, C2 and C3 are discharging, the second electrical impulse T-2 is generated as the voltage wave of source 10 again reaches the predetermined level in the predetermined direction. The electrical impulse T-2 causes the thyratron 32 to conduct, thereby energizing the relay R2. Since the reset key RK has not been operated, the relay R1 remains energized, whereby the normally open contacts R1a, R1b, R1c and R1d remain closed. Upon energization of the relay R2, the normally closed contracts R2a, R2b and R2c are transferred or opened. Additionally, the normally open relay contact R2a becomes closed, whereby the voltmeter 33 is connected across the capacitors C1, C2 and C3 and R4. The reading of the voltmeter 33 in hundredths of volts is then a direct numerical reading of the frequency of the voltage wave source.

Curve A of FIG. 4 is a curve resulting from adding the curves B, C, D and E. Curve B is the curve produced by the discharge of the capacitor C1, curve C is that produced by the discharge of capacitor C2 and curve D is produced by the discharge of capacitor C3. Curve E, which is a straight line, is the result of the voltage drop across the resistor R4. This bias voltage functions to give the proper numerical reading of the voltmeter in the range of frequencies being considered. In this example, the relays R1 and R2 switch in a relatively short period of time; i.e., the pickup time is relatively short compared to the time between the electrical impulses T-1 and T-2. For other applications where the period would be much shorter, electronic tubes or solid-state devices could be utilized for the switching devices in place of the relays R1 and R2.

From the foregoing, it is seen that the period of a pulsating voltage is determined and this period is converted to the frequency of the pulsating voltage. In this particular example, the period is determined by slope and level detection circuitry 20. It is then converted to frequency by connecting a series of fully charged capacitors to a discharging circuit for the duration of the period and then reading the remaining voltage upon termination of the period for the particular voltage wave source.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for determining the repetition rate of a pulsating voltage comprising: slope and level detecting means adapted to receive said pulsating voltage and operative to produce an electrical impulse as said pulsating voltage reaches a predetermined voltage with a predetermined slope; a plurality of capacitors connected in series; a voltage source for charging said capacitors; a first relay having a plurality of normally open and closed contacts with said normally closed contacts connecting each capacitor of said capacitors in parallel with an associated resistor of said voltage source; a discharging circuit for said capacitors consisting of a second plurality of resistors connected in series, with the last resistor thereof being connected to said last capacitor; a second relay having a plurality of normally closed contacts and at least one normally open contact, each normally closed contact being connected to an associated normally open contact of said first relay and connected to said second resistors of said second plurality of resistors whereby upon closing said normally open contacts, each second resistor is connected in parallel with an associated capacitor; voltage indicating means connectable to said capacitors to indicate the voltage thereof; means connecting said normally open contact of said second relay with said voltage indicating means; means connected to said slope and level detecting means for energizing said first relay upon said slope and level detecting means producing a first electrical impulse whereby said capacitors are disconnected from said voltage source and said first plurality of resistors and each capacitor is connected in parallel with an associated second resistor of said second plurality of resistors; and means connected to said slope and level detecting means for energizing said second relay upon said slope and level detecting means producing a second electrical impulse whereby said capacitors are disconnected from second plurality of resistors and are connected to said voltage indicating means to enable the same to determine the remaining voltage of said capacitors.

2. Apparatus for determining the repetition rate of a pulsating voltage as in claim 1 wherein said means for energizing said first and second relays are thyratrons.

3. Apparatus for determining the repetition rate of a pulsating voltage as in claim 1 further comprising constant voltage biasing means connected in series with said capacitors to provide a constant bias, thereby providing an infinitely long time constant so as to enable a numerical reading of said voltage indicating means at relatively low repetition rates.

References Cited by the Examiner

UNITED STATES PATENTS

| | | | |
|---|---|---|---|
| 2,026,421 | 12/35 | Fecker | 324—78 |
| 2,269,603 | 1/42 | Rockwood | 324—68 |
| 2,445,800 | 7/48 | Mortlock | 324—78 X |
| 2,609,424 | 9/52 | Elliot | 320—1 X |
| 2,795,273 | 6/57 | Putnam | 324—68 |
| 3,041,501 | 6/62 | Willits | 320—1 X |

FOREIGN PATENTS 855,941 12/60 Great Britain.

WALTER L. CARLSON, *Primary Examiner.*